United States Patent Office 3,334,119
Patented Aug. 1, 1967

3,334,119
TRIORGANOMETALLOXY TITANIUM, ZIRCONIUM AND HAFNIUM TRIALKOXYAMINES
Howard J. Cohen, Baltimore, Md., assignor to Glidden Company, Cleveland, Ohio, a corporation of Ohio
No Drawing. Filed Jan. 17, 1964, Ser. No. 338,324
16 Claims. (Cl. 260—429)

This invention relates to novel chemical compounds identified in the title, and to processes for preparing such compounds. More preferably, the invention relates to the triorganometalloxy titanium compounds. All compounds of the invention correspond in structure to the formula:

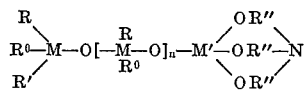

wherein R, R⁰ and R' can be the same or different and are selected from the group consisting of hydrocarbyl (e.g. alkyl, aryl, alkaryl, aralkyl, cycloalkyl, aralkenyl), hydrocarbyloxy (e.g. alkoxy, aryloxy, etc.) and fluohydrocarbyl groups of 1–12 carbon atoms, wherein M is a Group IV element selected from the group consisting of silicon, germanium, tin and lead, wherein M' is a Group IV element selected from the group consisting of titanium, zirconium and hafnium wherein R'' is an alkylene radical of 2–3 carbon atoms, and wherein $n$ is a number selected from the class consisting of 0 and 1.

The compounds of the invention find use in treating vegetal and/or inorganic fibers and/or fabrics prepared from such fiber(s) to improve their water-repellency. The compounds also find use in polymer chemistry as catalysts of the Ziegler type, as fungicides, bactericides, and/or mildewcides, as catalysts for preparing urethane foams, and as stabilizers impeding the heat- and/or light-induced decomposition of polyolefins, e.g. polyvinyl halides, polyvinylidene halides, etc.

Accordingly it is an object of this invention to provide novel compounds conforming to the formula set forth above.

It is another object to provide the preferred stannoxytitanium and siloxytitanium species of the compounds identified in the preceding object.

These and other objects will be understood from the foregoing and following description of the invention.

The triorganometalloxy titanium, zirconium and hafnium trialkoxyamines of the present invention can be prepared in various manners, the essentials of which are illustrated by the following general equations wherein, for brevity in illustration, R is used to represent any of R, R⁰ or R' as defined above, triethanolamine is used to represent itself or tri-isopropanolamine, wherein R'' and R''' are used to represent 1–6 carbon alkyl groups of starting materials (which alkyl groups find no place in the compounds of the invention), and wherein X represents halogen.

General methods (I) Synthesis from organometalloxy —M' compounds:

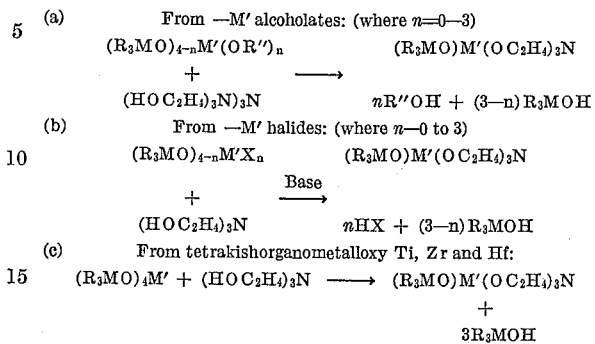

Note that (c) is the species of (a) where $n=0$.

(II) Synthesis from alkoxy —M'-trialkoxyamines:

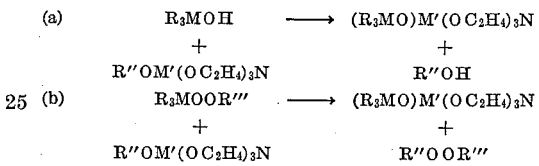

(III) Synthesis by simultaneous reaction of —M' halide, —M hydroxide and trialkanolamine:

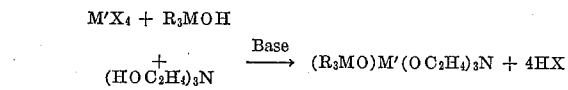

Variations of these illustrative methods are shown hereafter.

The following examples illustrate the foregoing general methods and the principles of the invention, and include the best modes presently known to me for practicing those principles in accordance with the invention. The embodiments of the examples are set forth for purposes of illustration, not as limitations.

Example 1.—*Triphenylsiloxytitanium triethoxyamine:*
$(C_6H_5)_3SiOTi(OC_2H_4)_3N$ 0.1 mole of triphenylsilanol dissolved in 600 ml. toluene is added to a refluxing solution of 0.1 mole of tetraisopropyl titanate in 250 ml. toluene. After removal of the isopropanol/toluene azetrope, 0.1 mole of triethanolamine is added. During the removal of the isopropanol/toluene azetrope a solid precipitates from the solution. The resulting mixture is filtered, washed with toluene and petroleum ether and dried at 105° C. in a vacuum oven, yielding 34.8 grams of product (74.14% of theory); melting point is 266°–269° C. Soxhlet extraction of the product with toluene gives a purified product having a melting point of 270–271° C. and which analyzes as follows:

| | Weight Percent | | | | | M.W. |
|---|---|---|---|---|---|---|
| | C | H | N | Ti | Si | |
| Found | 61.69 | 5.81 | 3.26 | { 10.22<br>{ 10.15 | 6.15 | [1] 468.62. |
| Calculated for: $(C_6H_5)_3SiOTi(OC_2H_4)_3N$ | 61.42 | 5.80 | 2.98 | 10.21 | 5.98 | 469.38. |

[1] Vapor Pressure Osmometer. (VPO used hereafter for brevity.)

The filtrate in the above example imparts water repellency to paper after evaporation of the solvent.

*Example 2.—Triphenylsiloxytitanium triethoxyamine:* $(C_6H_5)_3SiOTi(OC_2H_4)_3N$ 0.2253 mole of tetraisopropyl titanate is diluted with 1200 ml. toluene and refluxed. To this refluxing solution 0.2253 mole of triphenylsilanol is added in powder form. After the removal of the isopropanol/toluene azeotrope, triethanolamine is added drop-wise and again the isopropanol/toluene azeotrope is removed. The resulting precipitate is isolated by filtration, washed with toluene and petroleum ether, and dried in a vacuum oven. The total yield is 79.5118 g. (75.19% of theory), M.P.=267–270° C. and analyzes as follows:

Found: Titanium=10.22, 10.15%; silicon=6.15, 6.16%. Calculated for $(C_6H_5)_3SiOTi(OC_2H_4)_3N$: titanium=10.21%; silicon=5.98%.

Corresponding results are secured when the triphenylsilanol is replaced with its stoichiometrically equivalent weight of triphenylgermanium hydroxide.

*Example 3.—Triphenylsiloxytitanium triethoxyamine:* $(C_6H_5)_3SiOTi(OC_2H_4)_3N$ 0.01 mole of tetrabutyl titanate is diluted with 115 ml. toluene and refluxed. To this solution is added a hot solution of 0.02 mole triphenylsilanol dissolved in 245 ml. toluene. The resulting butanol/toluene azeotrope is removed, then 0.02 mole of triethanolamine is added. The resulting butanol/toluene azetorope is removed and the desired product precipitates from the solution. After filtering, washing with petroleum ether and drying, a yield of 3.3929 g. is isolated (72.28% of theoretical) and analyzed as follows:

Found: Titanium=10.48, 10.58%; silicon=6.07, 6.11%. Calculated for $(C_6H_5)_3SiOTi(OC_2H_4)_3N$: titanium=10.21%; silicon=5.98%.

*Example 4.—Triphenylsiloxytitanium triethoxyamine:* $(C_6H_5)_3SiOTi(OC_2H_4)_3N$ 0.002 mole of tetrakis-triphenylsiloxytitanium (prepared by the method described by Zeitler and Brown in J.A.C.S. 79, 4614 (1957) from triphenylsilanol and tetrabutyl titanate in equimolar amounts) is diluted with 250 ml. toluene and refluxed. 0.004 mole of triethanolamine is added and the entire mass is refluxed. The toluene solution is filtered hot, and the filtrate is allowed to cool slowly yielding a second precipitate. This second precipitate is filtered and washed with petroleum ether and dried. Yield is 0.3354 g. (35.73% of theoretical) and analyzes as follows:

Found: Titanium=10.42, 10.52%; silicon=5.54, 5.70%; M.W.=509.14 (by VPO). Calculated for $(C_6H_5)_3SiOTi(OC_2H_4)_3N$: titanium=10.21%; silicon=5.98%; molecular weight=469.4.

The first filter cake represents unreacted tetrakistriphenylsiloxytitanium.

Found: Titanium=4.18, 4.18%; silicon=9.74, 9.75%. Calculated for $[(C_6H_5)_3SiO]_4Ti$: titanium=4.17%; silicon=9.75%; molecular weight=1149.3.

Therefore the yield of $(C_6H_5)_3SiOTi(OC_2H_4)_3N$ based on conversion is 57.32% of theoretical.

*Example 5.—Diphenylmethylsiloxytitanium triethoxyamine:* $(C_6H_5)_2(CH_3)SiOTi(OC_2H_4)_3N$ 0.0301 mole of diphenylmethylsilicon acetate diluted with 160 ml. toluene is added to a refluxing solution of 0.0301 mole tetraisopropyl titanate in 120 ml. toluene. The isopropyl acetate/toluene azeotrope is removed, and 0.0301 mole of triethanolamine is added. The isopropanol/toluene azeotrope is removed, and then the solvent is removed under vacuum. The product is washed with petroleum ether, filtered, and dried. Yield is 10.5362 g. (85.92% of theoretical); melting point is 172–174° C. and the product analyzes as follows:

Found: Titanium=11.87%; silicon=6.68%; M.W.= (by VPO). Calculated for $$(C_6H_5)_2(CH_3)SiOTi(OC_2H_4)_3N$$

titanium=11.75%; silicon=6.90; M.W.=391.40.

Equivalent results are secured when the diphenylmethylsilicon acetate is replaced with a stoichiometrically equivalent weight of diphenylfluoethylsilicon acetate.

*Example 6.—Tribenzylsiloxytitanium triethoxyamine:* $(C_6H_5CH_2)_3SiOTi(OC_2H_4)_3N$ 0.1 mole of tribenzylsilicon hydroxide is dissolved in 200 ml. benzene and added to a refluxing solution of 0.1 mole of tetraisopropyl titanate in 400 ml. benzene and the isopropanol/benzene azeotrope removed. To this refluxing solution is added 0.1 mole triethanolamine and the resulting isopropanol/benzene azeotrope is removed. A yield of 29.3318 g. (57.34% of theoretical) of product is obtained after washing the product with benzene and petroleum ether. The melting point is 172–174° C. and the product analyzes as follows:

Found: Titanium=9.36%; silicon=5.18%; M.W. (by VPO)=509.14. Calculated for $$(C_6H_5CH_2)_3SiOTi(OC_2H_4)_3N$$

titanium=9.36%; silicon=5.49%; M.W.=511.56.

*Example 7.—Triphenylstannoxytitanium triethoxyamine:* $(C_6H_5)_3SnOTi(OC_2H_4)_3N$ 0.02 mole of triethanolamine is added to a refluxing solution of 0.02 mole of tetraisopropyl titanate in 600 ml. toluene and the isopropanol/toluene azetrope is removed. To this solution is added 0.02 mole of triphenyltin hydroxide as a powder and the isopropanol/toluene azeotrope removed. The product is isolated after stripping the solvent and is found to melt at 205–208° C. Yield is 8.7418 g. (78% of theory). Found: 8.82% Ti; 21.10% Sn (by wt.); M.W. (by VPO)—574.96. Calculated for $(C_6H_5)_3SnOTi(OC_2H_4)_3N$: 8.55% Ti; 21.19% Sn; M.W.=560.08.

Like results are secured when triphenyltin acetate is used instead of triphenyltin hydroxide on a stoichiometrically equivalent basis. On the same basis, the triphenyltin acetate can be replaced with triphenyllead acetate.

*Example 8.—Dibutylisopropoxystannoxytitanium triethoxyamine* $(C_4H_9)_2(i—C_3H_7O)SnOTi(OC_2H_4)_3N$ 0.05 mole of dibutyltin oxide is diluted with 500 ml. toluene (or other compatible organic solvent) and the water present is removed as an azeotrope, then 0.05 mole tetraisopropyl titanate is added and refluxed for several hours. A slurry or dispersion of the resulting insoluble addition product is secured. 0.05 mole of triethanolamine is added which results in a clear homogeneous solution. The product, of resinous character, is obtained after stripping off the solvent. The product analyzes as follows:

Found: titanium=9.72%; tin=23.59%. Calculated for $(C_4H_9)_2(i—C_3H_7O)SnOTi(OC_2H_4)_3N$: 9.54% Ti; 23.67% Sn; M.W.=502.07.

In another method for isolating the product, an aliquot of the toluene solution is added to an equal volume of petroleum ether. A white solid is obtained. Found: 9.92% Ti; 23.98% Sn.

The step of condensing dibutyltin oxide with tetraisopropyl titanate to produce $$(C_4H_9)_2(i—C_3H_7O)SnOTi(i—C_3H_7O)_3$$

is described and claimed in copending application Serial No. 338,294, filed Jan. 1, 1964, now Patent No. 3,307,973.

*Example 9.—Dibutylisopropoxystannoxydibutylstannoxytitanium triethoxyamine*

$$(C_4H_9)_2(i—C_3H_7O)SnO(C_4H_9)_2SnOTi(OC_2H_4)_3N$$

0.1 mole of triethanolamine is added to a refluxing solution of 0.1 mole tetraisopropyl titanate in 1 liter toluene (or other compatible organic solvent). The resulting isopropanol/toluene is removed and 0.2 mole of dibutyltin oxide is added. After several hours of refluxing a homogeneous solution is obtained. The solvent is fractionated and the resulting product is washed and filtered with petroleum ether resulting in the isolation of dibutylisopropoxystannoxydibutylstannoxytitanium triethoxyamine.

Found: titanium=6.70%, 6.71%; tin=33.06%, 33.82%; (mole ratio of Ti to Sn is 1:2); nitrogen=1.93%, 1.96%; carbon=36.86%, 36.98%; hydrogen=7.27%, 7.55%. Calculated for $(C_4H_9)_2(i-C_3H_7O)SnO(C_4H_9)_2SnOTi(OC_2H_4)_3N$ titanium=6.38%; tin=31.61%; nitrogen=1.87%; carbon=39.99; hydrogen=7.38%.

*Example 10.—Tributylstannoxytitanium triethoxyamine*: $(C_4H_9)_3SnOTi(OC_2H_4)_3N$ 0.1 mole of tributyltin acetate is reacted with 0.1 mole of tetrabutyl titanate in 2000 ml. toluene to form the stoichiometric quantity of by-product butyl acetate, which is removed by azeotropic distillation. 0.1 mole of triethanolamine is added and the butanol/toluene azeotrope is removed. The solvent is stripped with recovery of substantially the stoichiometric quantity of butanol. Infrared spectra of the resulting solution confirms the existence of the sought tin-carbon, tin-oxygen-titanium and titanium-oxygen-carbon bonds.

*Example 11.—Trihexylsiloxytitanium triethoxyamine*: $(C_6H_{13})_3SiOTi(OC_2H_4)_3N$ 0.1 mole of trihexylsilicon acetate is added to a refluxing solution of 0.1 mole of tetraisopropyl titanate in 1 liter toluene, and the isopropylacetate/toluene azeotrope is removed. Substantially the stoichiometric quantity of isopropyl acetate is recovered. 0.1 mole of triethanolamine is added and the isopropanol/toluene azeotrope is removed by distillation with recovery of substantially the stoichiometric quantity of isopropanol. Infra-red spectra of the resulting solution confirm the presence of the sought silicon-carbon, silicon-oxygen-titanium and titanium-oxygen-carbon bonds.

*Example 12.—Triphenylstannoxytitanium tri-isopropoxyamine*: $(C_6H_5)_3SnOTi(OC_3H_6)_3N$ 0.05 mole of tetraisopropyl titanate in 750 ml. toluene was refluxed. To this solution was added 0.05 mole triisopropanolamine dissolved in 250 ml. toluene, and the isopropanol/toluene azeotrope was removed. 0.05 mole triphenyltin hydroxide was added and again the isopropanol/toluene azeotrope was removed. The product was then stripped of most of the toluene. Petroleum ether was added yielding 23.124 g. of product (76.81% of theoretical). M.P.=188–189° C. (cloudy melts); at 208–210° C. a clear melt forms.

Found: titanium=7.12%; tin=20.30%. Calculated for $(C_6H_5)_3SnOTi(OC_3H_6)_3N$: titanium=7.95%; tin=19.71%.

Like results are secured when the triphenyltin hydroxide is replaced with a stoichiometrically equivalent weight of triphenyllead acetate.

*Example 13.—Tribenzylsiloxytitanium tri-isopropoxyamine*: $(C_6H_5CH_2)_3SiOTi(OC_3H_6)_3N$ 0.05 mole of tetraisopropyl titanate was diluted with 750 ml. of benzene and refluxed. To this solution was added 0.05 mole tribenzylsilicon hydroxide dissolved in 180 ml. benzene, which was added dropwise. The isopropanol was removed by distillation, and 0.05 mole triisopropanolamine was added and the isopropanol removed. The benzen was stripped and cyclohexane was added. The crude product was filtered and dried. Yield 27.68 grams (82% of theoretical).

Found: titanium=8.06%; silicon=4.40%. Calculated for $(C_6H_5CH_2)_3SiOTi(OC_3H_6)_3N$: titanium=8.65%; silicon=5.07%.

Corresponding results are secured when the tetraisopropyl titanate is replaced with a stoichiometrically equivalent weight of tetraisopropyl hafniate.

*Example 14.—Triphenylsiloxyzirconium triethanolamine*: $(C_6H_5)_3SiOZr(OC_2H_4)_3N$ 0.028738 mole of tetrabutyl zirconate in 700 ml. toluene was refluxed. To this solution was added 0.028738 mole of triphenylsilanol dissolved in 300 ml. toluene, and the butanol was removed. 0.028738 mole of triethanolamine was added and the butanol was removed. The solvent was removed. Yield 12.4360 g.

*Analysis.*—Calculated for $(C_6H_5)_3SiOZr(OC_2H_4)_3N$: zirconium=17.79%. Found: zirconium=17.09%, 17.49%.

Like results are secured when the tetrabutyl zirconate is replaced with a stoichiometrically equivalent weight of tetrabutyl hafniate.

*Example 15.—Triphenylstannoxyzirconium triethanolamine*: $(C_6H_5)_3SnOZr(OC_2H_4)_3N$ 0.05 mole of triethanolamine was added to a refluxing solution of 0.05 mole of tetrabutyl zirconate in 750 ml. toluene. The butanol-toluene azeotrope was removed, then 0.05 mole triphenyltin hydroxide was added. A small amount of solid was removed by filtration. The filtrate was stripped and the product was recrystallized from chloroform and petroleum ether, cooled, filtered, worked with cyclohexane and dried. Yield 26.1 grams of crude product (not recrystallized).

Calculated for $(C_6H_5)_3SnOZr(OC_2H_4)_3N$: zirconium=15.12%; tin=19.67%. Found: zirconium=17.90%; tin=21.18%.

Like results are secured when the triphenyltin hydroxide is replaced with a stoichiometricaly equivalent weight of triphenylgermanium acetate.

*Example 16*

Triphenylstannoxytitanium triethoxyamine, as prepared in Example 7 is tested for activity against several test fungi by the serial dilution technic covering a range of 0.2% by weight through 0.00039% by weight. All tests are performed in Difco Sabourand Liquid Medium at 25° C. and all tests are incubated for seven days. The following results are typical:

| Test fungi: | Minimum inhibitory concentration (wt. percent) |
|---|---|
| Caetomium globosum | 0.00625 |
| Penicillum italicum | 0.00312 |
| Glomerella cingulate | 0.00625 |
| Aspergillus niger | 0.00625 |
| Botrytis allii | 0.00625 |
| Pullularia pullulans | 0.00625 |

When the di(organostannoxy)titanium triethoxyamine of Example 9 is tested similarly, typical results are as follows:

| Test fungi: | Minimum inhibitory concentration (wt. percent) |
|---|---|
| Botrytis allii | 0.00156 |
| Pullularia pullulans | 0.00156 |
| Aspergillus niger | 0.0125 |

Likewise, when the triphenylstannoxytitanium tri-isopropoxyamine of Example 12 is so tested, typical results are:

| Test fungi: | Minimum inhibitory concentration (wt. percent) |
|---|---|
| Botrytis allii | 0.00156 |
| Pullularia pullulans | 0.00156 |
| Aspergillus niger | 0.0125 |

From the foregoing description of the invention, it will be apparent that the Group IV–A elements silicon, germanium, tin and lead are interchangeable for my purposes as set forth hereinabove, and that likewise the Group IV-B elements titanium, zirconium and hafnium are also interchangeable. I presently prefer the ≡SiOTi≡ and ≡SnOTi≡ species because of the present ready availability of precursors containing these elements. I also prefer R, R⁰ and R' to be hydrocarbyl groups of 3-7 carbons and particularly prefer isopropyl, butyl, hexyl, phenyl, and benzyl groups. These preferences likewise stem mainly from the present ready availability of starting precursors.

One skilled in the art will recognize that many variations of the invention can be made within the scope of the foregoing description and following claims, and that the essential step in the preparative methods consists in reacting an appropriately substituted Group IV-A metal compound with an appropriately substituted Group IV-B metal compound in an organic solvent under substantially anhydrous reflux conditions above room temperature with removal of the by-product(s) of the reaction. If one of the Group IV-B compounds used as reactant in this step does not already include a trialkanolamine as part of its substituents, then the foregoing reaction product can be further or simultaneously reacted with such an alkanolamine under the then prevailing reaction conditions. Under the conditions set forth in this paragraph, it will be noted from the examples that the trialkanolamine preferentially attaches itself to the Group IV-B metal. Pressure can of course be used in the reaction vessel to vary reflux temperature.

Having described my invention what I claim is:

1. A compound conforming to the formula

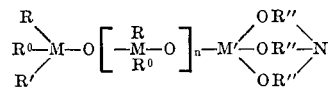

wherein R, R⁰ and R' can be the same or different and are selected from the group consisting of hydrocarbyl, oxyhydrocarbyl and fluohydrocarbyl groups having 1-12 carbon atoms; wherein M is a Group IV element selected from the class consisting of silicon, germanium, tin and lead, where $n$ is a number selected from the group consisting of 0 and 1; wherein M' is a Group IV element selected from the class consisting of titanium, zirconium and hafnium and wherein R'' is a divalent hydrocarbyl group of 2-3 carbons selected from the class consisting of ethylene groups, isopropylene groups and mixtures thereof.

2. A compound as claimed in claim 1 wherein $n$ is 0.

3. A compound as claimed in claim 2 wherein R'' is the ethylene group, and wherein R, R⁰ and R' are hydrocarbyl groups of 3-7 carbon atoms.

4. A compound as claimed in claim 3 wherein M is silicon and M' is titanium.

5. A compound as claimed in claim 4 which corresponds to the formula $(C_6H_5)_3SiOTi(OC_2H_4)_3N$.

6. A compound as claimed in claim 4 which corresponds to the formula $(C_6H_5)_2CH_3SiOTi(OC_2H_4)_3N$.

7. A compound as claimed in claim 4 which corresponds to the formula $(C_6H_5CH_2)_3SiOTi(OC_2H_4)_3N$.

8. A compound as claimed in claim 4 which corresponds to the formula $(C_6H_{13})_3SiOTi(OC_2H_4)_3N$.

9. A compound as claimed in claim 3 wherein M is tin and M' is titanium.

10. A compound as claimed in claim 9 which corresponds to the formula $(C_6H_5)_3SnOTi(OC_2H_4)_3N$.

11. A compound as claimed in claim 9 which corresponds to the formula $(C_4H_9)_3SnOTi(OC_2H_4)_3N$.

12. A compound as claimed in claim 9 which corresponds to the formula $$(C_4H_9)_2(i\text{-}OC_3H_7)SnOTi(OC_2H_4)_3N$$

13. A compound as claimed in claim 3 wherein M is germanium and M' is titanium.

14. A compound as claimed in claim 3 wherein M is lead and M' is titanium.

15. A compound as claimed in claim 2 wherein R'' is the isopropylene group and wherein R, R⁰ and R' are hydrocarbyl groups of 3-7 carbon atoms.

16. A compound as claimed in claim 1 which corresponds to the formula $$(C_4H_9)_2(i\text{-}C_3H_7O)SnO(C_4H_9)_2SnTOi(OC_2H_4)_3N$$

References Cited

UNITED STATES PATENTS

| | | | |
|---|---|---|---|
| 2,935,552 | 5/1960 | Samour | 260—429.5 |
| 3,046,268 | 7/1962 | Cohen | 260—429 X |

OTHER REFERENCES

Chemical Abstracts, vol. 53, pg. 16587a (1959).

TOBIAS E. LEVOW, *Primary Examiner.*

H. M. S. SNEED, *Assistant Examiner.*

UNITED STATES PATENT OFFICE
CERTIFICATE OF CORRECTION

Patent No. 3,334,119                      August 1, 1967

Howard J. Cohen

It is hereby certified that error appears in the above numbered patent requiring correction and that the said Letters Patent should read as corrected below.

Column 2, line 7, for "$(HOC_2H_4)_3N)_3N$" read -- $(HOC_2H_4)_3N$ --; line 8, for "n-0" read -- n=0 --; line 14, for "tetrakishorganometalloxy" read -- tetrakisorganometalloxy --; lines 51 and 53, for "azetrope", each occurrence, read -- azeotrope --; same column 2, in the table, first column, line 2 thereof, for "$(C_6H_6)_3SiOTi(OC_2H_4)_3N$" read -- $(C_6H_5)_3SiOTi(OC_2H_4)_3N$ --; column 3, line 30, for "azetorope" read -- azeotrope --; column 4, line 1, for "M.W.=" read -- M.W.=394,93 --; line 4, for "6.90" read -- 6.90% --; line 31, for "azetrope" read -- azeotrope --; line 37, for "(by VPO)-574.96" read -- (by VPO)= 574.96 --; same column 4, line 67, for "Jan. 1, 1964" read -- Jan. 17, 1964 --; column 5, line 14, for "bon=39.99;" read -- bon=39.99%; --; line 70, for "benzen" read -- benzene --; column 6, line 35, for "stoichiometricaly" read -- stoichiometrically --; column 8, line 35, the formula should appear as shown below instead of as in the patent:

$(C_4H_9)_2(i-C_3H_7O)SnO(C_4H_9)_2SnOTi(OC_2H_4)_3N$

Signed and sealed this 25th day of June 1968.

(SEAL)
Attest:

EDWARD M. FLETCHER, JR.                  EDWARD J. BRENNER
Attesting Officer                      Commissioner of Patents